F. GLEASON.
EXPANDING DRILL.
No. 48,548. Patented July 4, 1865.
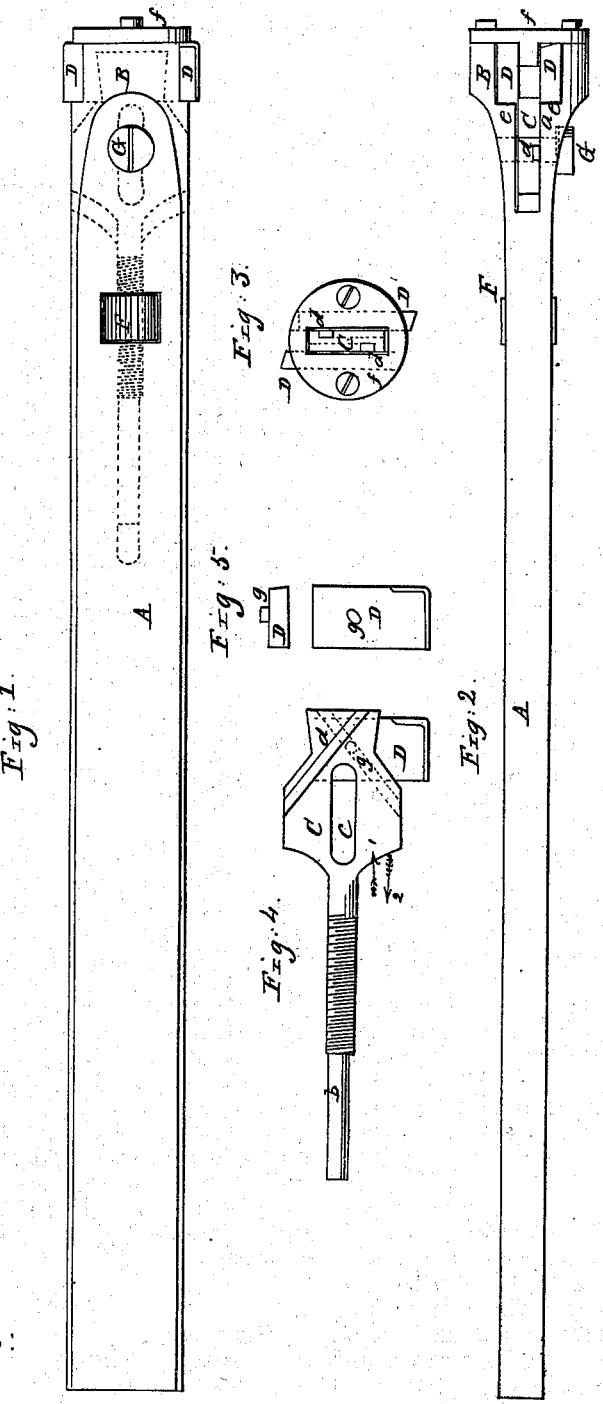

UNITED STATES PATENT OFFICE.

FRANKLIN GLEASON, OF PHILADELPHIA, PENNSYLVANIA.

IMPROVED EXPANDING DRILL.

Specification forming part of Letters Patent No. 48,548, dated July 4, 1865.

*To all whom it may concern:*

Be it known that I, FRANKLIN GLEASON, of Philadelphia, in the county of Philadelphia and State of Pennsylvania, have invented a new and Improved Expanding Drill; and I do hereby declare that the following is a full, clear, and exact description thereof, which will enable those skilled in the art to make and use the same, reference being had to the accompanying drawings, forming part of this specification, in which—

Figures 1 and 2 are side views of my invention; Fig. 3, an end view of the same; Figs. 4 and 5, views of detached parts pertaining to the same.

Similar letters of reference indicate corresponding parts.

This invention relates to a means employed for expanding the cutters, as hereinafter fully shown and described, whereby the cutters may be adjusted and secured in the desired position with the greatest facility.

A represents the stock of the drill, which may be of flat or rectangular form in its transverse section, its end B, in which the cutters are fixed, being of cylindrical form, and said end being slotted longitudinally, as shown at *a*, and drilled longitudinally to receive the shank *b* of a plate, C, to which the cutters D D are connected. This shank and plate are shown in Fig. 3, the plate C extending entirely across the slot *a*, the former being equal in width to the latter. The shank *b* has a screw-thread cut on it to receive a nut, F, the sides of which project through openings in the stock to admit of its being turned by the finger and thumb.

The plate C has an oblong slot, *c*, made in it, through which a screw, G, passes, said screw passing transversely through the stock and fitting at one end in a female thread in the stock. This screw G serves as a guide for the plate C, and also serves to hold the plate C firmly in position when screwed up, so as to cause the stock at opposite sides of the slot *a* to bear against said plate. The plate C has an oblique or diagonal groove, *d*, made in it at each side, said grooves having opposite positions, as will be seen by referring to Fig. 4.

The cutters D D are fitted transversely in the cylindrical end of the stock A, their inner edges bearing against shoulders *e e* in the stock and their outer edges bearing against a circular plate, *f*, which is screwed on the end B of the stock, as shown in Figs. 1 and 2, a cutter, D, being at each side of the plate C. The cutters D D are connected with the plate C by means of pins *g*, which are attached to or project from the cutters, and are fitted in the oblique grooves *d* in the plate.

From the above description it will be seen that if the plate C be moved in the stock A longitudinally the cutters D D will be moved laterally or into and out from the stock A, the moving outward of the plate in the direction indicated by arrow 1 causing the cutters D D to be forced outward from the stock, and the moving of the plate C in the opposite direction, as indicated by arrow 2, causing the cutters D D to be drawn inward. The plate C is moved by turning the nut F, and when it is desired to adjust the cutters the screw G must be unscrewed to relieve the plate C from the pressure of the cylindrical end B at opposite sides of the slot *a*, said screw being screwed up after the cutters are adjusted, in order to secure the cutters in the desired position.

Thus by this simple means I obtain an expanding drill which will admit of the cutters being expanded in a greater or less degree, as required, and secured firmly in position, when adjusted, with the greatest facility.

I claim as new and desire to secure by Letters Patent—

The plate C, provided with the oblique grooves *d* at opposite sides, fitted within the stock A, and adjusted by means of the nut F on the screw of the shank *b*, or an equivalent means, in connection with the cutters D D, fitted in the cylindrical part B of the stock, and connected to the plate C by pins *g* fitting in grooves *d*, substantially as and for the purpose set forth.

FRANKLIN GLEASON.

Witnesses:
JOHN H. TIBBEN,
GEO. R. KIRK.